(12) United States Patent
Devaraj et al.

(10) Patent No.: US 12,095,094 B1
(45) Date of Patent: Sep. 17, 2024

(54) AQUEOUS METHODS OF MACRO-PARTICLE MANUFACTURING

(71) Applicants: Varun Devaraj, Chennai (IN); Vikram Devaraj, Austin, TX (US)

(72) Inventors: Varun Devaraj, Chennai (IN); Vikram Devaraj, Austin, TX (US)

(73) Assignee: PIXION BATTERIES, INC., Austin, TX (US)

( * ) Notice: Subject to any disclaimer, the term of this patent is extended or adjusted under 35 U.S.C. 154(b) by 0 days.

(21) Appl. No.: 18/123,305

(22) Filed: Mar. 19, 2023

(51) Int. Cl.
*H01M 4/62* (2006.01)

(52) U.S. Cl.
CPC .......... *H01M 4/625* (2013.01); *H01M 4/622* (2013.01); *H01M 4/623* (2013.01)

(58) Field of Classification Search
CPC ....... H01M 4/625; H01M 4/622; H01M 4/623
See application file for complete search history.

(56) References Cited

U.S. PATENT DOCUMENTS

| | | | | |
|---|---|---|---|---|
| 2005/0250011 A1* | 11/2005 | Mitchell | ............. | H01M 4/0409 429/217 |
| 2010/0055572 A1* | 3/2010 | Park | ...................... | H01G 11/36 252/500 |
| 2013/0255872 A1* | 10/2013 | Zhong | ..................... | H01M 4/04 156/242 |

* cited by examiner

Primary Examiner — Andrew J. Oyer

(57) ABSTRACT

A method of producing conductor-speckled active material particles includes agitating conductive particles within an aqueous binder solution that includes a mixture of binder particulates suspended within a water-based medium. An intermediate powder including the conductive particles dispersed amongst the mixture of binder particulates is generated by evaporating water from the aqueous binder solution to generate. Subsequently, the particulate mixture including active material particles and the intermediate powder is agitated to generate a powder mixture of conductor-speckled active material agglomerations. Each of the conductor-speckled active material agglomerations includes a plurality of conductive particles in electrical contact with one or more active material particles. Further, the conductor-speckled active material agglomerations include binder particulates interspersed between one or more active material particles.

6 Claims, 5 Drawing Sheets

AQUEOUS METHODS OF MACRO-PARTICLE MANUFACTURING

BACKGROUND

Innovation of portable electronic devices has drawn attention towards efficient energy storage as transportable systems and portable devices such as smartphones, laptops, and smart health devices, have reduced in size while their energy needs have increased. Electrochemical storage and conversion devices are expanding the capabilities of these systems in a variety of fields including portable electronic devices, air and space craft technologies, passenger and cargo vehicles, and biomedical instrumentation. Electrochemical storage and conversion devices have designs and performance attributes specifically engineered to provide compatibility with a diverse range of application requirements and operating environments.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
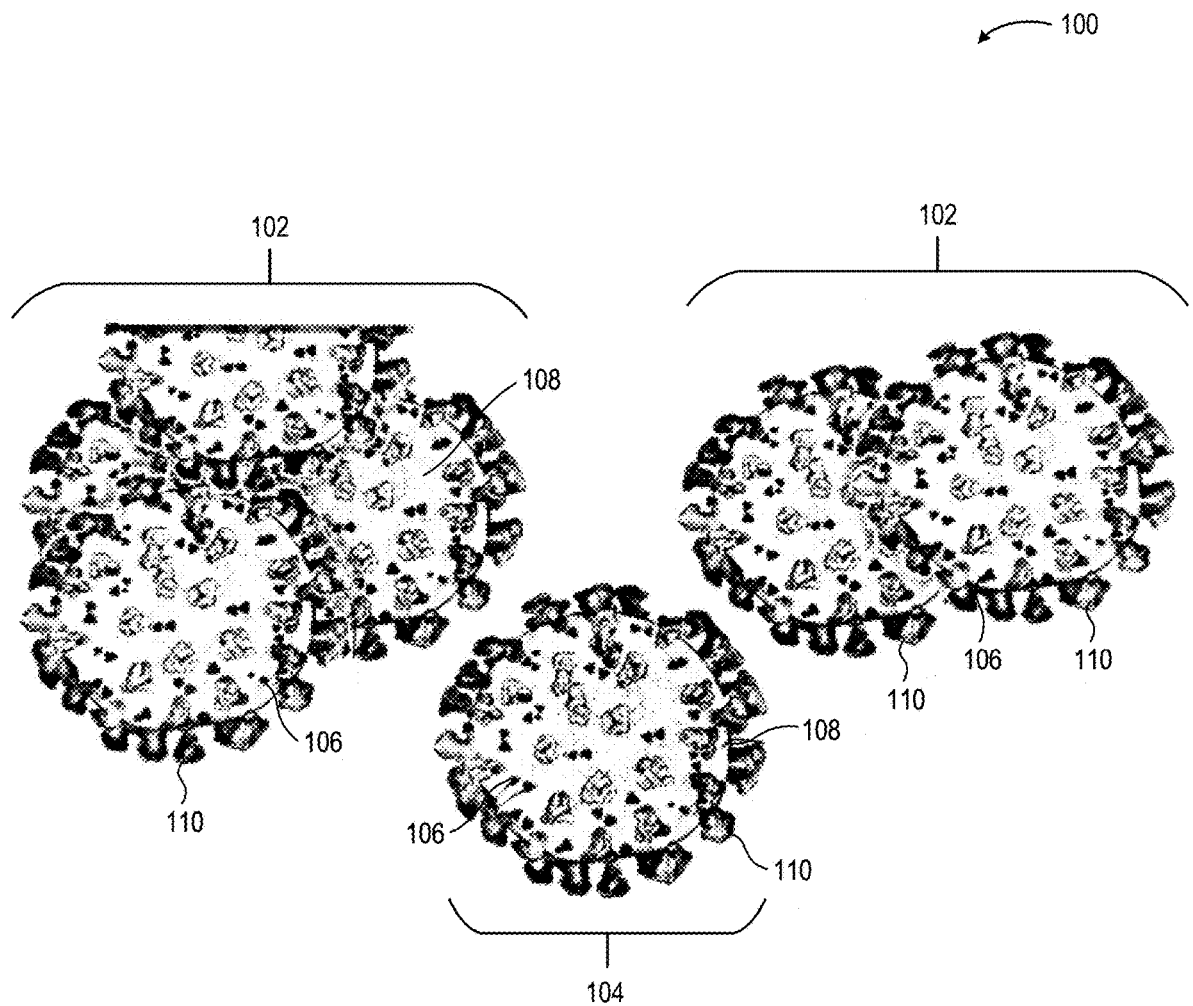
FIG. 1 is a diagram of a powder mixture aggregate of conductor-speckled active material particulate subunits in accordance with some embodiments.

Significant pressures exist to expand the functionality of energy storage and conversion devices, such as batteries, fuel cells, and electrochemical capacitors, in an ever-widening range of applications. Continued development has created a need for mechanically robust, high reliability, and high energy density electrochemical storage and conversion devices capable of good performance in a useful range of operating environments. Many recent advances in electrochemical storage technology are attributable to fabrication and integration of new materials for device components. Battery technology, for example, continues to rapidly develop, at least in part, due to the development of electrode and electrolyte materials for these systems.

Conventional electrode fabrication often involves a solvent-based approach including the mixing of active materials, conductive agents, polymeric binders, and solvents to form a slurry. The polymeric binders, such as polyvinylidene fluoride (PVDF), are pre-dissolved in the solvent, most commonly N-Methyl-2-pyrrolidone (NMP). During mixing, the polymeric binder flows around and partially coats active material and conductive agent particles. The resulting slurry is cast onto a metallic current collector and dried to evaporate the solvent thus forming a porous electrode. Evaporating the solvent creates a dry porous electrode; however, substantial heating and drying times are involved in evaporating the solvent and curing/binding the active materials onto the metallic current collector.

Electrode manufacturing techniques conventionally include solvent recovery systems during the drying process to recover evaporated solvent due to the high cost and potential pollution of traditional solvents. Less expensive and environmentally friendly solvents, such as aqueous based slurries, could eliminate the costs associated with the recovery system but the electrode would still require a time- and energy-demanding drying step. Further, the use of water as a catholyte or anolyte solvent provides considerable benefit, but it also presents significant challenges. In particular, the use of water is constrained by its reactivity with electroactive materials (e.g., lithium metal).

To address these problems and improve the electrode manufacturing process, FIGS. 1-5 describe techniques that replaces traditional solvents with water while limiting exposure of electroactive materials to the water. In some embodiments, a method of producing conductor-speckled active material particles includes agitating conductive particles within an aqueous binder solution that includes a mixture of binder particulates suspended within a water-based medium. An intermediate powder including the conductive particles dispersed amongst the mixture of binder particulates is generated by evaporating water from the aqueous binder solution to generate. Subsequently, the particulate mixture including active material particles and the intermediate powder is agitated to generate a powder mixture of conductor-speckled active material agglomerations. Each of the conductor-speckled active material agglomerations includes a plurality of conductive particles in electrical contact with one or more active material particles. Further, the conductor-speckled active material agglomerations include binder particulates interspersed between one or more active material particles. Thus, various embodiments disclosed herein provide for a dry powder-based manufacturing of conductor-speckled active material that eliminates usage of conventional solvents and associated heating and drying times from the electrode manufacturing process.

FIG. 1 is a diagram of a powder mixture aggregate 100 of conductor-speckled active material particulate subunits in accordance with some embodiments. For the purposes of this disclosure the terms: particle, particulate, particulate subunit, primary particle, micro sphere, aggregate and agglomeration are used consistent with the definitions provided in a National Institute of Standards and Technology (NIST) publication titled, The Use of Nomenclature in Dispersion Science and Technology, previously issued as NIST Special Publications 945 and 946, August 2001 which provides guidelines for the use of technical and scientific nomenclature relevant to ceramic dispersion, the entire disclosure of which is hereby incorporated by reference herein. As illustrated, the powder mixture aggregate 100 includes a plurality of particulate subunits 102 including one or more conductor-speckled active material particulate subunits 104 held together by electrostatic forces.

In some embodiments, active material primary particles include one or more cathode material selected from the group including $LiCoO_2$, $LiNiO_2$, $LiMnO_2$, $LiMn_2O_4$, $LiNi_xMn_{2-x}O_4$, $LiFePO_4$, $LiMnPO_4$, $LiCoPO_4$, $LiFe_xMn_{1-x}PO_4$, $LiNi_xMn_yCo_{1-x-y}O_2$, $Li_{1+x}Ni_yMn_zCo_{1-x-y-z}O_2$, $LiNi_xMn_yCo_zAl_{1-x-y-z}O_2$, and $Li_{1+x}Ni_yMn_{1-x}Co_zO_2$. In some embodiments, the active material primary particles in the above group are carbon coated or otherwise treated. In other embodiments, active material primary particles include one or more anode material selected from the group including synthetic graphite particulate, natural graphite particulate, Si nanocomposites, $LiTiO_2$, $Li_4Ti_5O_{12}$, Sn particulate, and SiOx/Si particulate.

In some embodiments, the active material primary particles comprise the powder mixture aggregate 100 of conductor-speckled active material particulate subunits at greater than or equal to about 10% by weight of the powder mixture aggregate, optionally greater than or equal to about 20% by weight of the powder mixture aggregate, optionally greater than or equal to about 30% by weight of the powder mixture aggregate, optionally greater than or equal to about 40% by weight of the powder mixture aggregate, optionally greater than or equal to about 50% by weight of the powder mixture aggregate, optionally greater than or equal to about 60% by weight of the powder mixture aggregate, optionally greater than or equal to about 70% by weight of the powder mixture aggregate, optionally greater than or equal to about 80% by weight of the powder mixture aggregate, optionally greater than or equal to about 90% by weight of the powder mixture aggregate, optionally greater than or equal to about 95% by weight of the powder mixture aggregate, and in certain variations, optionally greater than or equal to about 96% by weight of the powder mixture aggregate.

Each of the conductor-speckled active material particulate subunits 104 includes a plurality of conductive particles 106 in electrical contact with an active material primary particle 108. In this manner, a first conductive particle of a first conductor-speckled active material particulate subunit is in electrical contact with one or more conductive particles of a second conductor-speckled active material particulate subunit, thereby forming an electrical path(s) connecting the plurality of active material primary particles 104. In various embodiments, conductive particles include carbon additives such as one or more of C65 carbon black, C45 carbon black, super P carbon black, acetylene black, ketjenblack carbon black, carbon nanotubes, graphene, carbon nanofibers, carbon fibers, and the like.

In some embodiments, the conductive particles 106 comprise the powder mixture aggregate 100 of conductor-speckled active material particulate subunits at greater than or equal to about 0.1% by weight of the powder mixture aggregate, optionally greater than or equal to about 0.5% by weight of the powder mixture aggregate, optionally greater than or equal to about 1.0% by weight of the powder mixture aggregate, optionally greater than or equal to about 1.5% by weight of the powder mixture aggregate, optionally greater than or equal to about 2.0% by weight of the powder mixture aggregate, optionally greater than or equal to about 2.5% by weight of the powder mixture aggregate, optionally greater than or equal to about 3.0% by weight of the powder mixture aggregate, optionally greater than or equal to about 3.5% by weight of the powder mixture aggregate, optionally greater than or equal to about 4.0% by weight of the powder mixture aggregate, optionally greater than or equal to about 4.5% by weight of the powder mixture aggregate, and in certain variations, optionally greater than or equal to about 5.0% by weight of the powder mixture aggregate.

Further, a mixture of binder particulate subunits 110 are interspersed between the conductor-speckled active material particulate subunits. The binder particulate subunits include, in various embodiments, a mixture including one or more of polyvinylidene difluoride (PVDF), poly(vinylidene fluoride-co-hexafluoropropylene) (PVDF-HFP), polytetrafluoroethylene (PTFE), carboxymethyl cellulose (CMC), polyvinylfluoride (PVF), polyethylene (PE), polypropylene (PP), polyethylene oxide (PEO), polyethylene vinyl acetate (PEVA), polyurethane (PU), polypropylene rubber (PPR), ethylene propylene rubber (EPR), styrene butadiene rubber (SBR), styrene-ethylene-butylene-styrene rubber (SEBS), acrylonitrile butadiene styrene rubber (ABS), polyisobutylene (PIB), polyvinyl alcohol (PVA), phenoxy resin, polyethylene terephthalate (PET), nylon, polymethylmethacrylate (PMMA), polyvinyl chloride (PVC), polyphenylene sulfide (PPS), polystyrene (PS), pitch, tar, asphalt, or bitumen.

In some embodiments, the binder particulate subunits 110 comprise the powder mixture aggregate 100 of conductor-speckled active material particulate subunits at greater than or equal to about 2.0% by weight of the powder mixture aggregate, optionally greater than or equal to about 3.0% by weight of the powder mixture aggregate, optionally greater than or equal to about 4.0% by weight of the powder mixture aggregate, optionally greater than or equal to about 5.0% by weight of the powder mixture aggregate, optionally greater than or equal to about 6.0% by weight of the powder mixture aggregate, optionally greater than or equal to about 7.0% by weight of the powder mixture aggregate, optionally greater than or equal to about 8.0% by weight of the powder mixture aggregate, optionally greater than or equal to about 9.0% by weight of the powder mixture aggregate, and in certain variations, optionally greater than or equal to about 10.0% by weight of the powder mixture aggregate.

In some embodiments, the mixture or aggregate of binder particulate subunits 110 includes binder particulate subunits with each of the binder particulate subunits being an assembly of primary binder particles. As will be appreciated by those skilled in the art, primary binder particles, which are the discrete unit of binder material, are often nanoparticle-sized particles that characteristically aggregate or agglomerate into larger units by adhesion or other weak physical interactions. These aggregates or agglomerates include an assembly of primary particles, that in some embodiments are joined together at the corners or edges, so that total surface area of the aggregates or agglomerates does not differ appreciable from the sum of the specific surface areas of primary particles. In consequence, the aggregates or agglomerates are not fixed units but could change their size and shape. Altering conditions (temperature, pressure, pH-value, viscosity, etc.) of the surrounding medium result in varied agglomerates. Larger aggregates or agglomerates may also break down into smaller aggregates or agglomerates and vice versa, smaller aggregates or agglomerates may again form larger agglomerates. The density of the aggregates or agglomerates depends on the particle size distribution of the primary particles.

As will appreciated by those skilled in the art, the various conductive particles and binder particulates described herein have a tendency to cluster and clump together into particle aggregates or agglomerates. Accordingly, such as described below in more detail with respect to FIGS. 2-5, various methods are utilized to agitate particles and separate agglomerations into smaller sizes closer to their constituent particles for better dispersion within the powder mixture 100.

Figure 2:
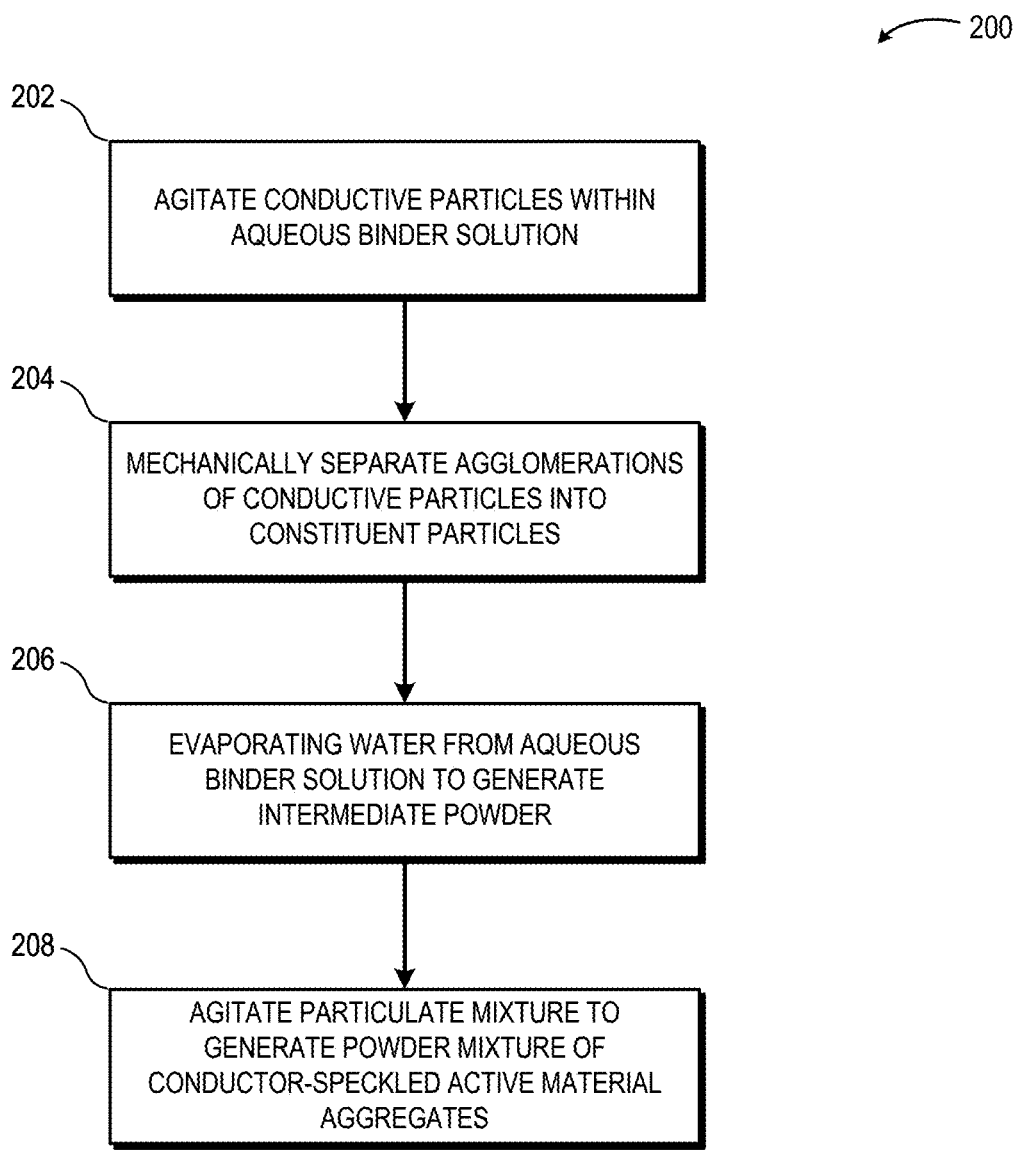
FIG. 2 is a block diagram of a method of producing an aggregation of conductor-speckled active material particulate subunits in accordance with some embodiments.

FIG. 2 is a block diagram of a method 200 of producing an aggregation of conductor-speckled active material particulate subunits in accordance with some embodiments. For ease of illustration and description, the method 200 is described below with reference to and in an example context of the powder mixture of FIG. 1. However, the method 200 is not limited to these example contexts, but instead may be employed for any of a variety of possible configurations using the guidelines provided herein.

The method 200 begins at block 202 with agitating conductive particles within an aqueous binder solution. The aqueous binder solution includes a mixture of binder particulates suspended within a water-based medium. The binder particulates include, in various embodiments, a powder mixture including one or more of polyvinylidene difluoride (PVDF), poly(vinylidene fluoride-co-hexafluoropropylene) (PVDF-HFP), polytetrafluoroethylene (PTFE),), carboxymethyl cellulose (CMC), polyvinylfluoride (PVF), polyethylene (PE), polypropylene (PP), polyethylene oxide (PEO), polyethylene vinyl acetate (PEVA), polyurethane (PU), polypropylene rubber (PPR), ethylene propylene rubber (EPR), styrene butadiene rubber (SBR), styrene-ethylene-butylene-styrene rubber (SEBS), acrylonitrile butadiene styrene rubber (ABS), polyisobutylene (PIB), polyvinyl alcohol (PVA), phenoxy resin, polyethylene terephthalate (PET), nylon, polymethylmethacrylate (PMMA), polyvinyl chloride (PVC), polyphenylene sulfide (PPS), polystyrene (PS), pitch, tar, asphalt, or bitumen. When multiple binders are used, the melting point and softening point of each binder in the binder system may be the same or different.

In one embodiment, the aqueous binder solution is a commercially available dispersion or emulsion that contains binder particulates dispersed in an aqueous solution. In another embodiment, the aqueous binder solution is prepared by introducing a wetting agent to a dry powder mixture of binder particulates. The wetting agent, in various embodiments, includes surfactants, non-surfactants, organic solvents, and the like to reduce solution surface tension and thus to promote wetting. The presence of wetting agents permits uniform dispersion of powdery materials, such as binder particulates and conductive particles, into aqueous dispersions. Some materials, such as carbonaceous materials will not readily disperse in an aqueous dispersion without the aid of wetting agent. Useful wetting agents include, but are not limited to, ionic and non-ionic surfactants such as isopropyl alcohol, organic liquids that are compatible with the aqueous dispersion, including but not limited to NMP, DMSO, acetone, and the like. After wetting the dry powder mixture of binder particulates, block 202 continues with agitating the wetted binder particulates within a volume of aqueous solution (e.g., water) by subjecting the aqueous binder solution to a high shear mixing, sonification, or any other suitable method of uniformly distributing the binder particulates in the aqueous solution.

In some embodiments, the binder particulates comprise the aqueous binder solution at greater than or equal to about 1.0% by weight of the aqueous binder solution, optionally greater than or equal to about 5.0% by weight of the aqueous binder solution, optionally greater than or equal to about 10.0% by weight of the aqueous binder solution, optionally greater than or equal to about 15.0% by weight of the aqueous binder solution, optionally greater than or equal to about 20.0% by weight of the aqueous binder solution, optionally greater than or equal to about 25.0% by weight of the aqueous binder solution, optionally greater than or equal to about 30.0% by weight of the aqueous binder solution, optionally greater than or equal to about 35.0% by weight of the aqueous binder solution, optionally greater than or equal to about 40.0% by weight of the aqueous binder solution, and in certain variations, optionally greater than or equal to about 45% by weight of the aqueous binder solution.

The block 202 includes agitating conductive particles within the aqueous binder solution. In various embodiments, conductive particles include carbon additives such as one or more of C65 carbon black, C45 carbon black, super P carbon black, acetylene black, ketjenblack carbon black, carbon nanotubes, graphene, carbon nanofibers, carbon fibers, and the like. In some embodiments, dry conductive particle powder is directly introduced to the aqueous binder solution.

As will be appreciated by those skilled in the art, conductive particles have a tendency to cluster and clump together into conductive particle agglomerations. Accordingly, method 200 proceeds in some embodiments at block 204 with mechanically separating one or more agglomerations of conductive particles into constituent particles for dispersion within the aqueous binder solution. In some embodiments, block 204 includes agitating the conductive particles within the aqueous binder solution by subjecting the aqueous binder solution to a high shear mixing, sonification, or any other suitable method of breaking down conductive particle agglomerations into constituent particles or smaller agglomerations and/or uniformly distributing the conductive particles in the aqueous binder solution. In other embodiments, a conductive particle solution is prepared by introducing a wetting agent to a dry powder mixture of conductive particles. After wetting the dry powder mixture of conductive particles, block 204 continues by agitating the wetted conductive particles within a volume of a primarily aqueous solution, such as by subjecting the aqueous conductive particle solution to a high shear mixing, sonification, or any other suitable method of uniformly distributing the conductive particles in the aqueous solution. Subsequently, the aqueous conductive particle solution is introduced to the aqueous binder solution and similarly agitated to form an intermediate aqueous solution including a uniform distribution of binder particulates and conductive particles.

In some embodiments, the conductive particles comprise the aqueous binder solution at greater than or equal to about 1% by weight of the aqueous binder solution, optionally greater than or equal to about 5% by weight of the aqueous binder solution, optionally greater than or equal to about 10% by weight of the aqueous binder solution, optionally greater than or equal to about 15% by weight of the aqueous binder solution, optionally greater than or equal to about 20% by weight of the aqueous binder solution, optionally greater than or equal to about 25% by weight of the aqueous binder solution, optionally greater than or equal to about 30% by weight of the aqueous binder solution, optionally greater than or equal to about 35% by weight of the aqueous binder solution, optionally greater than or equal to about 40% by weight of the aqueous binder solution, and in certain variations, optionally greater than or equal to about 45% by weight of the aqueous binder solution.

At block 206, the method 200 continues by evaporating water from the aqueous binder solution to generate an intermediate powder or aggregate including the conductive particles dispersed amongst the mixture of binder particulates. In some embodiments, the operations of block 206 include mechanically agitating the intermediate aqueous solution including the uniform distribution of binder particulates and conductive particles during evaporation. The viscosity of the intermediate aqueous solution increases as evaporation decreases water content. As the water content of the intermediate aqueous solution decreases, it becomes increasingly more important to maintain or even increase the previous level of mechanical agitation of particles within the intermediate aqueous solution so that particles are kept continuously moving to prevent preferential settling due to the different densities of the constituent particles or other effects.

In various embodiments, after all remaining water is evaporated, the intermediate aqueous solution is dried into a mixture of binder particulate and conductive particle aggregates. Such aggregates may, in various embodiments, be mechanically processed (e.g., ground, crushed, and the like) to produce a finer intermediate powder. As will be appreciated by those skilled in the art, binder particulates tend to clump together. Pure mechanical forces are insufficient for breaking such clumps into their constituent particles before the applied forces heat up binder material to a temperature at which binder material become pliable and become even more difficult to separate into the smaller sizes of its constituent particles, for example that temperature is approximately 170 degrees Celsius for PVDF. In contrast, the operations of block 206 generates an intermediate powder within which one or more conductive particles are positioned between binder particulates. This presence of conductive particle additives decreases the interparticle forces between binder particulates by introducing spacing and decreases the amount of agglomeration, thereby generating a powdery composition of binder particulates and conductive particles down at their respective constituent particle sizes.

At block 208, the method 200 continues by agitating a particulate mixture including active material particles and the intermediate powder or aggregate of block 206 to generate a powder mixture of conductor-speckled active material aggregates or agglomerations. In some embodiments, active material particles include one or more cathode material selected from the group including, but not limited to, $LiCoO_2$, $LiNiO_2$, $LiMnO_2$, $LiMn_2O_4$, $LiNi_xMn_{2-x}O_4$, $LiFePO_4$, $LiMnPO_4$, $LiCoPO_4$, $LiFe_xMn_{1-x}PO_4$, $LiNi_xM-n_yCo_{1-x-y}O_2$, $Li_{1+x}Ni_yMn_zCO_{1-x-y-z}O_2$, $LiNi_xMn_y-Co_zAl_{1-x-y-z}O_2$, $Li_{1+x}Ni_yMn_{1-x}Co_zO_2$, and $LiNi_{0.8}Co_{0.1}Mn_{0.1}O_2$ (NCM811). In some embodiments the active material primary particles in the above group are carbon coated or otherwise treated. In other embodiments, active material particles include one or more anode material selected from the group including, but not limited to, synthetic graphite particulate, natural graphite particulate, Si particle-C fiber nanocomposites, $LiTiO_2$, $Li_4Ti_5O_{12}$, Sn particulate, and SiOx/Si particulate. In some embodiments, the operations of block 208 include cooling the particulate mixture to prevent the aforementioned problems of heating binder materials to a temperature at which they become pliable and agglomerating together.

In various embodiments, the operations of method 200 also includes an optional step (not shown) of sprinkling an additional amount of conductive particles to further increase the composition by weight and overall conductivity of the mixture of conductor-speckled active material aggregates. This sprinkling may occur at any point throughout method 200 and further may occur at two or more different steps throughout method 200.

The resulting dried mixture or aggregations includes conductor-speckled active material aggregates, such as the one or more conductor-speckled active material particulate subunits 104 of FIG. 1, that includes a plurality of conductive particles in electrical contact with one or more active material particles. The conductor-speckled active material aggregates further include binder particulates interspersed between one or more active material particles. In this manner, a composite powder of conductor-speckled active material aggregates is generated in an aqueous processing method in which active material does not come into contact with water. The composite powder can be utilized in a variety of fabrication techniques for manufacturing electrodes and other energy storage devices.

Figure 3:
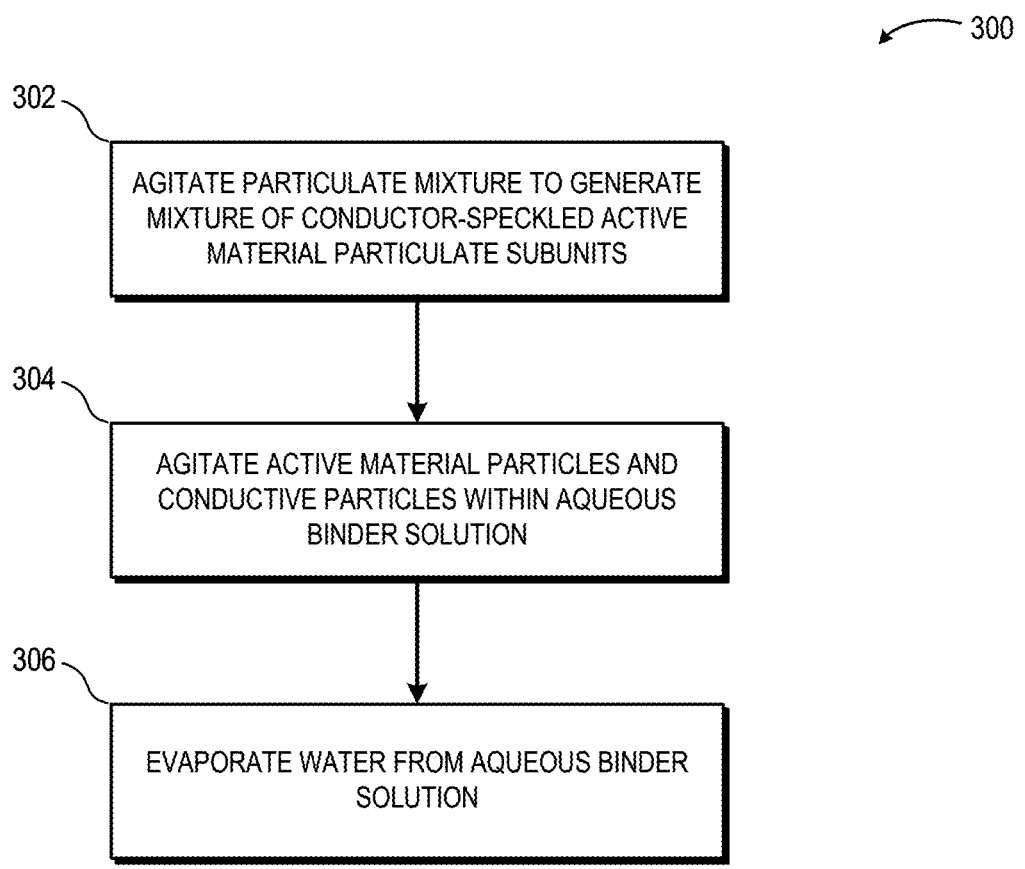
FIG. 3 is a block diagram of another method of producing conductor-speckled active material composite particles or particulate subunits in accordance with some embodiments.

FIG. 3 is a block diagram of another method 300 of producing conductor-speckled active material composite particles or particulate subunits in accordance with some embodiments. For ease of illustration and description, the method 300 is described below with reference to and in an example context of the powder mixture of FIG. 1. However, the method 300 is not limited to these example contexts, but instead may be employed for any of a variety of possible configurations using the guidelines provided herein.

The method 300 begins at block 302 with agitating a particulate mixture including active material particles and conductive particles to generate a mixture of conductor-speckled active material particulate subunits. The operations of block 302 include mechanically agitating, high shear mixing, and/or any other suitable method of uniformly distributing the conductive particles amongst the active material particles. In various embodiments, each of the conductor-speckled active material particles includes a plurality of conductive particles in electrical contact with an active material particle.

In one embodiment, the operations of block 302 includes agitating a dry powder mixture of conductive particles and active material particles to generate a powder mixture of conductor-speckled active material particulate subunits. In another embodiment, the operations of block 302 includes agitating a dry powder mixture of active material particles within an aqueous conductive particle solution. For example, in some embodiments, block 302 includes agitating the conductive particles within an aqueous solution by subjecting the aqueous solution to a high shear mixing, sonification, or any other suitable method of breaking down conductive particle agglomerations into constituent particles, or at least smaller agglomerations, and/or uniformly distributing the conductive particles in the aqueous solution. In other embodiments, a conductive particle solution is prepared by introducing a wetting agent to a dry powder mixture of conductive particles. After wetting the dry powder mixture of conductive particles, block 302 continues with agitating the wetted conductive particles within a volume of aqueous solution (e.g., water) by subjecting the aqueous conductive particle solution to a high shear mixing, sonification, or any other suitable method of uniformly distributing the conductive particles in the aqueous solution. Subsequently, the dry powder mixture of active material particles is introduced to the aqueous conductive particle solution. In other embodiments, the operations of block 302 includes agitating an aqueous active material solution and an aqueous conductive particle solution together to generate an aqueous mixture of conductor-speckled active material particulate subunit.

At block 304, the method 300 continues by agitating the active material particles and conductive particles within an aqueous binder solution. In some embodiments, the aqueous binder solution includes a mixture of binder particulates suspended within a water-based medium. In one embodiment, the aqueous binder solution is a commercially available dispersion, or emulsion, that contains binder particulates dispersed in an aqueous solution. In another embodiment, similar to that previously described in more detail with respect to FIG. 2, the aqueous binder solution is prepared by introducing a wetting agent to a dry powder mixture of binder particulates. After wetting the dry powder mixture of binder particulates, block 304 continues with agitating the wetted binder particulates within a volume of aqueous solution (e.g., water) by subjecting the aqueous binder solution to a high shear mixing, sonification, or any other suitable method of uniformly distributing the binder particulates in the aqueous solution.

In some embodiments, the binder particulates comprise the aqueous binder solution at greater than or equal to about 1.0% by weight of the aqueous binder solution, optionally greater than or equal to about 5.0% by weight of the aqueous binder solution, optionally greater than or equal to about 10.0% by weight of the aqueous binder solution, optionally greater than or equal to about 15.0% by weight of the aqueous binder solution, optionally greater than or equal to about 20.0% by weight of the aqueous binder solution, optionally greater than or equal to about 25.0% by weight of the aqueous binder solution, optionally greater than or equal to about 30.0% by weight of the aqueous binder solution, optionally greater than or equal to about 35.0% by weight of the aqueous binder solution, optionally greater than or equal to about 40.0% by weight of the aqueous binder solution, and in certain variations, optionally greater than or equal to about 45% by weight of the aqueous binder solution.

In one embodiment, the aqueous mixture of conductor-speckled active material particles is mixed together with the aqueous binder solution such that the resulting solution includes active material particles, conductive particles, and binder particulates uniformly distributed in the aqueous binder solution. In another embodiment, the agitating operations of block 304 includes agitating a dry mixture of active material particles within the aqueous binder solution prior to adding a dry mixture of conductive particles. In other embodiments, the agitating operations of block 304 include agitating a dry mixture of conductive particles within the aqueous binder solution prior to adding a dry mixture of active material particles.

In another embodiment, the agitating operations of block 304 includes agitating a dry mixture of active material particles within the aqueous binder solution prior to adding an aqueous conductive particle solution. Additionally, in some embodiments, the agitating operations of block 304 includes agitating an aqueous conductive particle solution within the aqueous binder solution prior to adding a dry mixture of active material particles. In contrast to method 200, the operations of block 304 include active material particles coming into contact with water. As will be appreciated by those skilled in the art, certain active materials are more resistant to the detrimental effects when in the presence of water. These active materials include, for example, coated LFP (e.g., carbon-coated LFP) and lower nickel NMCs (e.g., NMC111 rather than the more sensitive NMC811 and NMC9055).

At block 306, the method 300 continues by evaporating water from the aqueous binder solution to generate a powder including the mixture of binder particulates interspersed between the conductor-speckled active material particulate subunits. In some embodiments, the operations of block 306 include mechanically agitating the aqueous binder solution including the uniform distribution of binder particulates, conductive particles, and active material particles during evaporation. The viscosity of the aqueous binder solution increases as evaporation decreases water content. As the water content of the aqueous binder solution decreases, it becomes increasingly more important to maintain (or increase) the previous level of mechanical agitation of particles within the aqueous binder solution so that particles are kept continuously moving to prevent preferential settling (e.g., due to the different densities of the constituent particles).

In various embodiments, after all remaining water is evaporated, the aqueous binder solution is dried into a powder mixture of conductor-speckled active material aggregates. Such aggregates may, in various embodiments, be mechanically processed (e.g., ground, crushed, and the like) to produce a finer powder mixture. As will be appreciated by those skilled in the art, binder particulates tend to clump together. Pure mechanical forces are insufficient for breaking such clumps into their constituent particles before the applied forces heat up binder material to a temperature (e.g., approximately 170 degrees Celsius for PVDF) at which binder material become pliable and become even more difficult to separate into the smaller sizes of its constituent particles. In contrast, the operations of block 306 generates a powder within which one or more conductive particles are positioned between binder particulates. This presence of conductive particle additives decreases the inter-particle forces between binder particulates by introducing spacing and decreases the amount of agglomeration, thereby generating a powder mixture of conductor-speckled active material agglomerations. In some embodiments, the operations of block 306 include cooling the particulate mixture during mechanical agitation to prevent the aforementioned problems of heating binder materials to a temperature at which they become pliable and agglomerating together.

In various embodiments, the operations of method 300 also includes an optional step (not shown) of sprinkling an additional amount of conductive particles to further increase the composition by weight and overall conductivity of the mixture of conductor-speckled active material aggregates. This sprinkling may occur at any point throughout method 300 and further may occur at two or more different steps throughout method 300.

Figure 4:
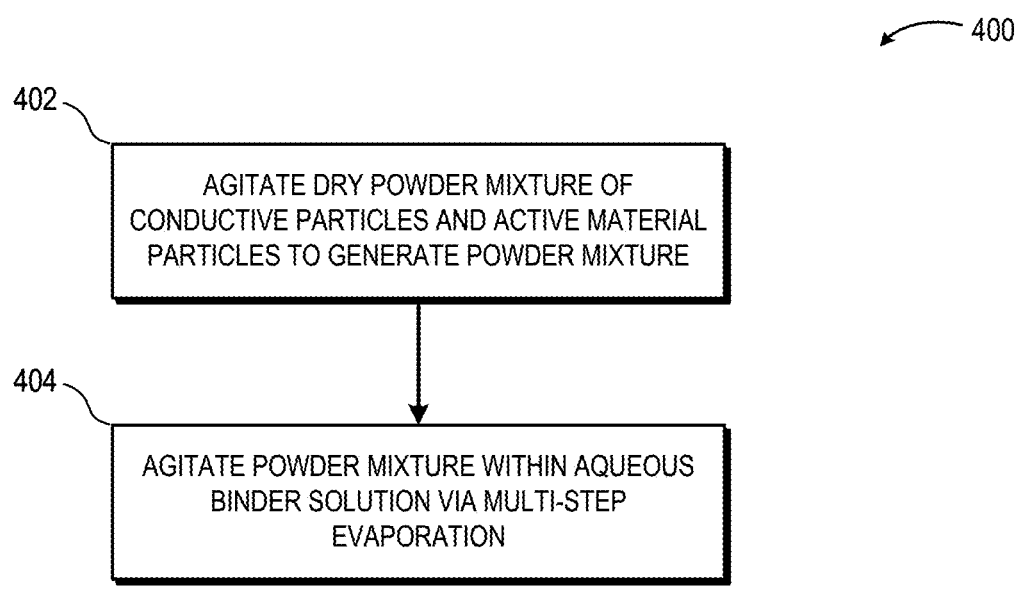
FIG. 4 is a block diagram of a method of producing conductor-speckled active material particles via multi-step evaporation in accordance with some embodiments.

FIG. 4 is a block diagram of a method 400 of producing conductor-speckled active material particles via multi-step evaporation in accordance with some embodiments. For ease of illustration and description, the method 400 is described below with reference to and in an example context of the powder mixture of FIG. 1. However, the method 400 is not limited to these example contexts, but instead may be employed for any of a variety of possible configurations using the guidelines provided herein.

The method 400 begins at block 402 with agitating a dry powder mixture of conductive particles and active material particles to generate a powder mixture or aggregate of conductor-speckled active material particles. In various embodiments, the operations of block 402 include mechanically agitating, high shear mixing, and/or any other suitable method of uniformly distributing the conductive particles amongst the active material particles.

At block 404, the method 400 continues by agitating the powder mixture of conductor-speckled active material particles within an aqueous binder solution via a multi-step evaporation. In various embodiments, the aqueous binder solution includes a mixture of binder particulates suspended within a water-based medium such as previously described in more detail with respect to FIGS. 2-3. In one embodiment, the aqueous binder solution is a commercially available dispersion (or emulsion) that contains binder particulates dispersed in an aqueous solution. In another embodiment, the aqueous binder solution is prepared by introducing a wetting agent to a dry powder mixture of binder particulates. After wetting the dry powder mixture of binder particulates, the wetted binder particulates are agitated within a volume of aqueous solution (e.g., water) by subjecting the aqueous binder solution to a high shear mixing, sonification, or any other suitable method of uniformly distributing the binder particulates in the aqueous solution.

In various embodiments, the multi-step evaporation of block 404 includes introducing the dry powder mixture of conductor-speckled active material particles to a first volume of aqueous binder solution that is less than a total volume of aqueous binder solution. After evaporating water from that first mixture, the resulting mixture includes conductor-speckled active material agglomerations, such as the one or more conductor-speckled active material particulate subunits 104 of FIG. 1, that includes a plurality of conductive particles in electrical contact with one or more active material particles. The conductor-speckled active material agglomerations further include binder particulates interspersed between one or more active material particles; the binder particulates are present within the resulting mixture of conductor-speckled active material agglomerations at a first percentage by weight of the resulting mixture.

Subsequently, the resulting mixture of conductor-speckled active material aggregates including a first percentage by weight of binder particulates is introduced to a second volume of aqueous binder solution that is at least a portion of the total volume of aqueous binder solution remaining. After evaporating water from that second mixture, the resulting mixture includes conductor-speckled active material aggregates with binder particulates interspersed between one or more active material particles; the binder particulates are present within the resulting mixture of conductor-speckled active material agglomerations at a second percentage by weight of the resulting mixture. As is evident, the second percentage is higher than the first percentage by weight of binder particulates.

For example, in one embodiment, the multi-step evaporation of block 404 is a two-step evaporation that includes introducing the dry powder mixture of conductor-speckled active material particles to a first half of a total volume of aqueous binder solution. After evaporating water from that first mixture, the resulting mixture includes conductor-speckled active material particulate subunits with binder particulates interspersed between one or more active material particles; the binder particulates are present within the resulting mixture of conductor-speckled active material particulate subunits at a first percentage by weight of the resulting mixture.

Subsequently, the resulting mixture of conductor-speckled active material particulate subunits including a first percentage by weight of binder particulates is introduced to the remaining second half of the total volume of aqueous binder solution. After evaporating water from that second mixture, the resulting mixture includes conductor-speckled active material particulate subunits with binder particulates interspersed between one or more active material particles; the binder particulates are now present within the resulting mixture of conductor-speckled active material particulate subunits at a second percentage by weight of the resulting mixture. As is evident, the second percentage is approximately double the first percentage by weight of binder particulates.

In various embodiments, water is evaporated from the aqueous binder solution to generate a dried powder mixture of conductor-speckled active material aggregates. Such aggregates may, in various embodiments of method 400, be mechanically processed (e.g., ground, crushed, and the like) to produce a finer powder mixture. The mechanical processing operations generates a powder within which one or more conductive particles are positioned between binder particulates. This presence of conductive particle additives decreases the interparticle forces between binder particulates by introducing spacing and decreases the amount of agglomeration, thereby generating a powder mixture of conductor-speckled active material agglomerations. In some embodiments, the mechanical processing operations include cooling the particulate mixture during mechanical agitation to prevent the aforementioned problems of heating binder materials to a temperature at which they become pliable and agglomerating together.

In various embodiments, the operations of method 400 also includes an optional step (not shown) of sprinkling an additional amount of conductive particles to further increase the composition by weight and overall conductivity of the mixture of conductor-speckled active material aggregates. This sprinkling may occur at any point throughout method 400 and further may occur at two or more different steps throughout method 400.

It should be recognized that FIG. 4 is described above in the context of a two-step evaporation using approximately equal volumes of aqueous binder solution for ease of illustration and description. However, those skilled in the art will recognize that the method of FIG. 4 may include any number of mixture and evaporation steps without departing from the scope of this disclosure. It should further be recognized that the method of FIG. 4 may include differing volumes of aqueous binder solution spread amongst any number of mixture and evaporation steps without departing from the scope of this disclosure. For example, in another embodiment, the multi-step evaporation of block 404 is a three-step evaporation in which a first step includes mixing and evaporating of dry powder mixture of conductor-speckled active material particles within 50% of a total volume of aqueous binder solution, a second step includes mixing and evaporating of the resulting conductor-speckled active material particulate subunits within 25% of the total volume of aqueous binder solution, and a third step includes mixing and evaporating of the resulting conductor-speckled active material particulate subunits within 25% of the total volume of aqueous binder solution.

In another embodiment, the multi-step evaporation of block 404 is a continuous evaporation process in which a small portion of a total volume of aqueous binder solution is mixed with and evaporated away at approximately the same time from a dry powder mixture of conductor-speckled active material particles. Control of the water evaporation rate is achievable by evaporating water from the mixture at a rate that is approximately matched to the desired rate of introducing aqueous binder solution to the mixture. This evaporation is performable using techniques known in the art. Evaporation can be performed under atmospheric or reduced pressure conditions, and at ambient temperatures, or higher temperatures that do not degrade the constituent particles. As will be appreciated, the pressure and/or temperature selected depends on the solvent (e.g., water), polymers, and/or other constituent materials present within the dry mixture and binder solution, as well as the relative amounts of these materials. Accordingly, a chart of the binder particulate percentage by weight over time of the resulting mixture of conductor-speckled active material agglomerations looks more like a sloping line or curved line (e.g., depending on whether rates of introducing and evaporating of binder solution are varied over time) with continuous evaporation instead of a stair-step shape associated with the batched, multi-step evaporation processes previously discussed.

In this manner, the batched, multi-step evaporation and continuous evaporation processes of method 400 enable the generation of a composite powder of conductor-speckled active material agglomerations with an aqueous processing method that reduces the amount of water and the amount of time that active material particles are in contact with water. This is useful for active materials that are more tolerant of aqueous environments (e.g., LFP) and can be utilized in a conductor-speckled active material agglomeration generation process that is not limited to strictly avoiding contact between active material particles and water.

Figure 5:
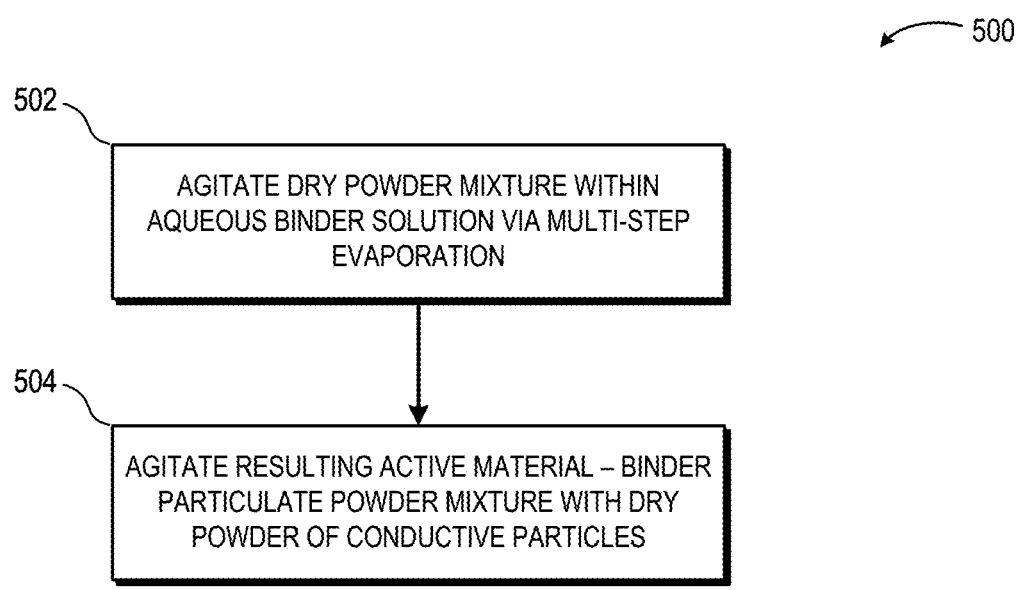
FIG. 5 is a block diagram of another method of producing a mixture of conductor-speckled active material particulate subunits via multi-step evaporation in accordance with some embodiments.

Similarly, FIG. 5 is a block diagram of another method 500 of producing a mixture of conductor-speckled active material particulate subunits via multi-step evaporation in accordance with some embodiments. For ease of illustration and description, the method 500 is described below with reference to and in an example context of the powder mixture of FIG. 1. However, the method 500 is not limited to these example contexts, but instead may be employed for any of a variety of possible configurations using the guidelines provided herein.

The method begins at block 502 with agitating a dry powder mixture of active material particles within an aqueous binder solution via a multi-step evaporation. In various embodiments, the aqueous binder solution includes a mixture of binder particulates suspended within a water-based medium such as previously described in more detail with respect to FIGS. 2-4. In one embodiment, the aqueous binder solution is a commercially available dispersion (or emulsion) that contains binder particulates dispersed in an aqueous solution. In another embodiment, the aqueous binder solution is prepared by introducing a wetting agent to a dry powder mixture of binder particulates. After wetting the dry powder mixture of binder particulates, the wetted binder particulates are agitated within a volume of aqueous solution (e.g., water) by subjecting the aqueous binder solution to a high shear mixing, sonification, or any other suitable method of uniformly distributing the binder particulates in the aqueous solution. In other embodiments, the aqueous binder solution includes conductive particles uniformly distributed within the aqueous binder solution (such as the intermediate aqueous solution including a uniform distribution of binder particulates and conductive particles of FIG. 2).

In various embodiments, the multi-step evaporation of block 502 includes introducing the dry powder mixture of active material particles to a first volume of aqueous binder solution that is less than a total volume of aqueous binder solution. After evaporating water from that first mixture, the resulting mixture includes binder particulates interspersed amongst a plurality of active material particles; the binder particulates are present within the resulting mixture of at a first percentage by weight of the resulting mixture.

Subsequently, the resulting active material-binder particulate mixture including a first percentage by weight of binder particulates is introduced to a second volume of aqueous binder solution that is at least a portion of the total volume of aqueous binder solution remaining. After evaporating water from that second mixture, the resulting active material-binder particulate mixture includes binder particulates interspersed between one or more active material particles; the binder particulates are present within the resulting active material-binder particulate mixture at a second percentage by weight of the resulting mixture. As is evident, the second percentage is higher than the first percentage by weight of binder particulates.

For example, in one embodiment, the multi-step evaporation of block 502 is a two-step evaporation that includes introducing the dry powder mixture of active material particles to a first half of a total volume of aqueous binder solution. After evaporating water from that first mixture, the resulting active material-binder particulate mixture includes binder particulates interspersed between one or more active material particles; the binder particulates are present within the resulting active material-binder particulate mixture at a first percentage by weight of the resulting mixture.

Subsequently, the resulting active material-binder particulate mixture including a first percentage by weight of binder particulates is introduced to the remaining second half of the total volume of aqueous binder solution. After evaporating water from that second mixture, the resulting active material-binder particulate mixture includes binder particulates interspersed between one or more active material particles; the binder particulates are now present within the resulting active material-binder particulate mixture at a second percentage by weight of the resulting mixture. As is evident, the second percentage is approximately double the first percentage by weight of binder particulates.

It should be recognized that FIG. 5 is described above in the context of a two-step evaporation using approximately equal volumes of aqueous binder solution for ease of illustration and description. However, those skilled in the art will recognize that the method of FIG. 5 may include any number of mixture and evaporation steps without departing from the scope of this disclosure. It should further be recognized that the method of FIG. 5 may include differing volumes of aqueous binder solution spread amongst any number of mixture and evaporation steps without departing from the scope of this disclosure. For example, in another embodiment, the multi-step evaporation of block 502 is a three-step evaporation in which a first step includes mixing and evaporating of dry powder mixture of active material particles within 50% of a total volume of aqueous binder solution, a second step includes mixing and evaporating of the resulting active material-binder particulate mixture within 25% of the total volume of aqueous binder solution, and a third step includes mixing and evaporating of the resulting active material-binder particulate mixture within 25% of the total volume of aqueous binder solution.

In another embodiment, the multi-step evaporation of block 502 is a continuous evaporation process in which a small portion of a total volume of aqueous binder solution is mixed with and evaporated away at approximately the same time from a dry powder mixture of active material particles. Control of the water evaporation rate is achievable by evaporating water from the mixture at a rate that is approximately matched to the desired rate of introducing aqueous binder solution to the mixture. This evaporation is performable using techniques known in the art. Evaporation can be performed under atmospheric or reduced pressure conditions, and at ambient temperatures, or higher temperatures that do not degrade the constituent particles. As will be appreciated, the pressure and/or temperature selected depends on the solvent (e.g., water), polymers, and/or other constituent materials present within the dry mixture and binder solution, as well as the relative amounts of these materials. Accordingly, a chart of the binder particulate percentage by weight over time of the resulting active material-binder particulate mixture looks more like a sloping line or curved line (e.g., depending on whether rates of introducing and evaporating of binder solution are varied over time) with continuous evaporation instead of a stair-step shape associated with the batched, multi-step evaporation processes previously discussed.

At block 504, the resulting active material-binder particulate powder mixture is agitated with a dry powder mixture of conductive particles. In various embodiments, the dry powder mixture of conductive particles is mixed with the active material-binder particulate powder mixture by subjecting the mixture to a high shear mixing, sonification, or any other suitable method of uniformly distributing the conductive particles amongst the active material-binder particulate powder mixture to generate conductor-speckled active material agglomerations, such as the one or more conductor-speckled active material particle agglomerations 102 of FIG. 1.

In various embodiments, water is evaporated from the aqueous binder solution to generate a dried powder mixture of conductor-speckled active material aggregates. Such aggregates may, in various embodiments of method 500, be mechanically processed (e.g., ground, crushed, and the like) to produce a finer powder mixture. The mechanical processing operations generates a powder within which one or more conductive particles are positioned between binder particulates. This presence of conductive particle additives decreases the interparticle forces between binder particulates by introducing spacing and decreases the amount of agglomeration, thereby generating a powder mixture of conductor-speckled active material agglomerations. In some embodiments, the mechanical processing operations include cooling the particulate mixture during mechanical agitation to prevent the aforementioned problems of heating binder materials to a temperature at which they become pliable and agglomerating together.

In various embodiments, the operations of method 500 also includes an optional step (not shown) of sprinkling an additional amount of conductive particles to further increase the composition by weight and overall conductivity of the mixture of conductor-speckled active material aggregates. This sprinkling may occur at any point throughout method 500 and further may occur at two or more different steps throughout method 500.

In this manner, the batched, multi-step evaporation and continuous evaporation processes of method 500 enable the generation of a composite powder of conductor-speckled active material particulate subunits with an aqueous processing method that reduces the amount of water and the amount of time that active material particles are in contact with water. This is useful for active materials that are more tolerant of aqueous environments (e.g., LFP) and can be utilized in a conductor-speckled active material agglomeration generation process that is not limited to strictly avoiding contact between active material particles and water.

The configurations herein substantially overcome the above-described shortcomings of conventional electrode formation by providing a dry powder-based manufacturing of conductor-speckled active material for eliminating the solvent and associated heating and drying times from the electrode manufacturing process. Electrodes manufactured with dry particles, such as the conductor-speckled active material particulate subunits described herein, coated on current collectors would represent an improved manufacturing process.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A powder mixture (100), comprising:
   a plurality of particle agglomerations (102), wherein each of the plurality of particle agglomerations (102) includes:
   one or more conductor-speckled active material particles (104) held together by electrostatic forces, wherein each of the conductor-speckled active material particles (104) includes a plurality of conductive particles (106) in electrical contact with an active material particle (108), and further wherein the active material particle excludes activated carbon and includes an anode electroactive material or a cathode electroactive material;
   a mixture of binder particulates (110) interspersed between the conductor-speckled active material particles, wherein the mixture of binder particulates remain below a softening temperature at which constituent particles of the mixture of binder particulates become pliable and begin agglomerating together, and further wherein the powder mixture includes less than 3 percent by weight of the mixture of binder particulates, and wherein the plurality of particle agglomerations are produced by agitating active material particles, conductive particles, and binder particulates within a solvent solution; and evaporating the solvent solution to generate the powder mixture of particle agglomerations.

2. The powder of claim 1, wherein the mixture of binder particulates includes materials selected from the group consisting of PVDF, CMC, PMMA, and PTFE.

3. The powder of claim 1, wherein a content of the active material particles in the powder mixture is at least 90% by weight.

4. The powder of claim 1, wherein the mixture of binder particulates includes a plurality of binder particle agglomerates held together by electrostatic forces, and further wherein each of the binder particle agglomerates is an assembly of primary binder particles.

5. The powder of claim 1, wherein a first conductive particle of a first conductor-speckled active material particle is in electrical contact with one or more conductive particles of a second conductor-speckled active material particle.

6. The powder mixture of claim 1, wherein at least a first volume of the solvent solution is introduced to and evaporated away from the active mate particles, conductive particles, and binder particulates prior to introducing and evaporating a second volume of the solvent solution away from the active material particles, conductive articles, and binder particulates.

* * * * *